INVENTORS:
CORNELIS BEZEMER
HARCO J. TADEMA
JACOB J. H. C. HOUBOLT

BY: A. H. McCarthy
THEIR AGENT

INVENTORS:
CORNELIS BEZEMER
HARCO J. TADEMA
JACOB J. H. C. HOUBOLT

BY: J. H. McCarthy
THEIR AGENT

United States Patent Office 3,700,593
Patented Oct. 24, 1972

3,700,593
APPARATUS AND METHOD FOR REMOVING OIL PRODUCTS FLOATING ON WATER
Cornelis Bezemer, Harco J. Tadema, and Jacob J. H. C. Houbolt, Rijswijk, Netherlands, assignors to Shell Oil Company, New York, N.Y.
Continuation of abandoned application Ser. No. 753,695, Aug. 19, 1968. This application Dec. 21, 1970, Ser. No. 100,376
Claims priority application Great Britain, Sept. 18, 1967, 42,331/67
Int. Cl. B01d 15/00
U.S. Cl. 210—40
22 Claims

ABSTRACT OF THE DISCLOSURE

An apparatus and method for removing oil slicks from a water surface wherein an elongated absorbent porous body is positioned along the water surface by base means which include squeezers for removing oil from the body, a container for collecting the oil and drive means for moving the body past the squeezers.

CROSS-REFERENCE TO RELATED APPLICATION

This application is a continuation of application Ser. No. 753,695, filed Aug. 16, 1968, now abandoned.

BACKGROUND OF THE INVENTION

The invention relates to a device for removing oil products floating on water, for example, oil discharged from ships as a result of tank-cleaning, or liquids leaking from pipelines or for any other reason escaping into the sea, a waterway or a harbor.

Water pollution by oil, particularly in harbors, waterways, coastal waters or lakes, is a serious problem, as oil products floating on the water surface may cause great damage on beaches and embankments, on ships by befoulment, and to sea-birds and other marine fauna and flora.

Numerous attemps have been made to remove oil which has spread on water, such attemps being based on various principles such as burning, optionally with the aid of wicks, absorbing and sinking, dispersing with the aid of emulsifiers and skimming. Some of these methods lead only to removal from the surface and consequently are not suitable for averting all the dangers indicated above. Others, however, are intended to remove the oil layer or patch completely. One of these latter methods is removal by skimming, which offers the further advantage that the oil can at least partially be recovered.

It has been proposed to remove oil from water surfaces by means of an endless belt driven around two rollers, one roller being immersed in the oil-covered water layer and the other being mounted on board a barge. It has also been proposed to remove such oil layers by means of a suction nozzle floating on the water surface and connected by means of a hose to a barge where the oil is then collected. Problems associated with these methods are the quantity of water transferred with the oil into the barge and the low collecting capacity.

SUMMARY OF THE INVENTION

The present invention now provides a device having an oil recovery capacity superior to that of known devices and which is capable of collecting the oil without transferring noticeable amounts of water with the oil.

According to the apparatus and method of the invention the device for removing crude oil, oil products or the like from a water surface comprises a porous body floating on water capable of absorbing oil by capillary suction and means for squeezing the absorbed oil from the porous body and collecting the recovered oil.

According to the invention the squeezing means may comprise at least one pair of rotatable parallel cylinders placed at a distance from each other and leaving a slot-shaped passage for the porous body to be squeezed. Alternatively, according to the invention the squeezing means may comprise a pair of endless belts each rotatable around a series of cylinders and mutually arranged in such a way that a slot-shaped passage of decreasing height is left through which the porous body to be squeezed is passed. Preferably the slot-shaped passage is such that the porous body is squeezed up to at most two-thirds of its maximum squeezing capacity.

According to the invention the squeezing means may be placed on a barge or ship, an oil-collecting container being placed below the squeezing means and guide elements being provided for leading the oil-saturated porous body to the squeezing means.

BRIEF DESCRIPTION OF THE DRAWINGS

The invention will now be illustrated with reference to the accompanying drawings in which.

DESCRIPTION OF THE PREFERRED EMBODIMENT

Figure 1:
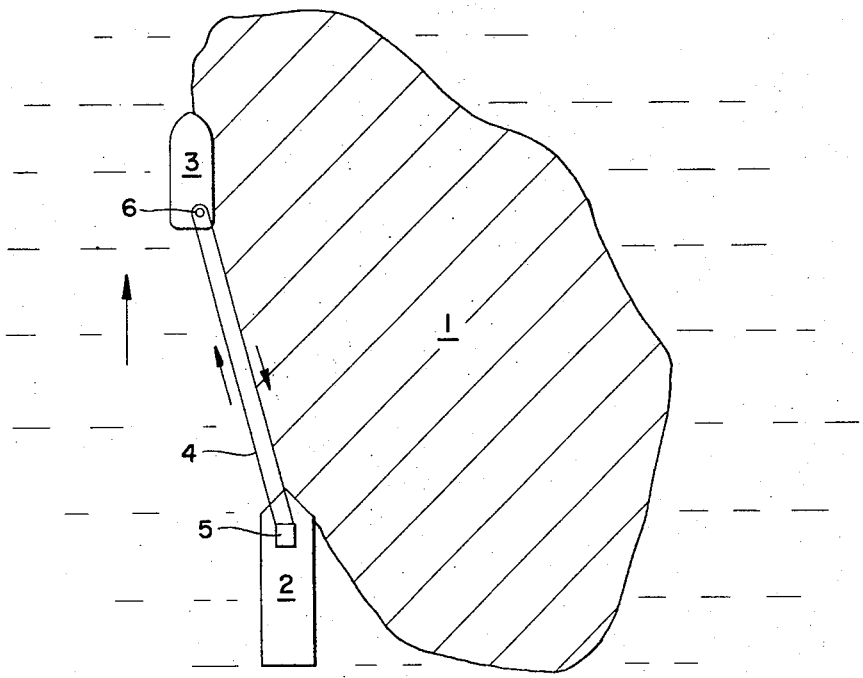
FIG. 1 is a schematic plan view of the invention employing two vessels for removing an oil slick from a body of water.

In FIG. 1, 1 designates an oil patch, for instance in the open sea or a bay, which is to be removed. Use is made of two vessels, an oil-collecting barge 2 and a guiding boat 3 which together comprise base means for an elongated porous body 4. Between the barge 2 and the boat 3 the elongated porous body 4 is present in the form of an endless connection between the two boats. The porous body may be cylindrical and, if desired, enveloped within a permeable cloth, and may consist of sections which are interconnected. On board the collecting barge 2 a squeezing means 5 is provided, while on board the guiding boat 3 guiding means 6 are provided which return the porous body to the barge 2.

Figure 2:
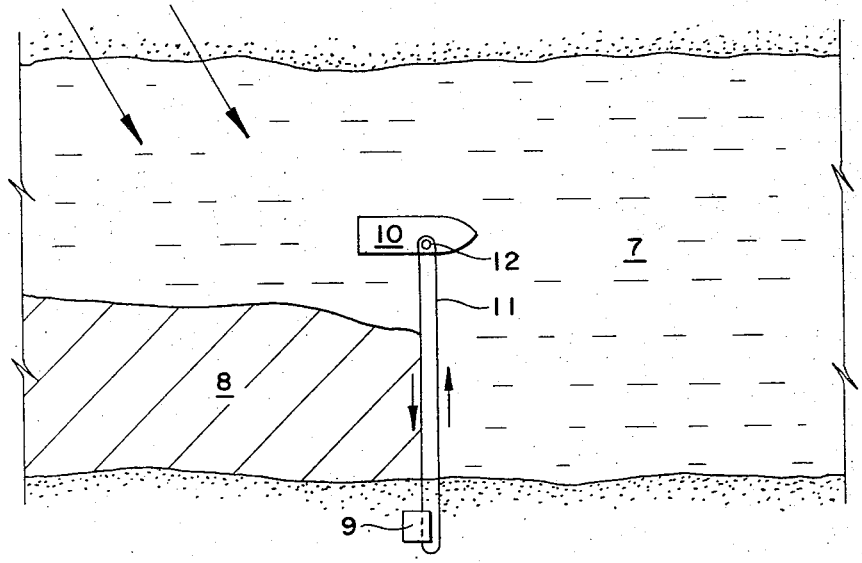
FIG. 2 is a schematic plan view of the invention as adapted to remove an oil slick from a waterway.

In FIG. 2 this system is adapted to collecting oil from a water way 7. Assuming that there is a wind direction as indicated by the arrows, an oil patch 8 will tend to be drifted against the opposite embankment. A shore installation including a device 9 for moving and squeezing the porous body is placed on land and also includes oil storage means. A guiding boat 10 is present on the waterway and the endless porous body 11 moves between the guiding boat and the device 9. In this embodiment the guiding boat 10 and the device 9 comprise base means for the porous body. On the guiding boat a guiding means 12 is provided for returning the porous body to the shore. It is of course possible to make use of two boats on a waterway as well.

It is also possible to use two boats each collecting the oil instead of using one collecting barge and a guiding boat. In some cases it may even be possible to use only one boat, which may occur in situations where the porous body will be able to spread over the water surface automatically owing, for instance, to the wind direction being favorable.

Preferably the porous body has an average porosity of at least 80%; the porous body may comprise an organic polymer having a density between 0.85 and 1.50. Suitable polymers for this purpose are polypropylene or polyamides.

According to the invention the polymer may consist of fibers with a fiber grade between 1.5 and 100 denier.

The capillary properties of the porous body depend on the surface properties of the fibers, which define the oil wetting degree, on the packing density defining the porosity, and on the fiber grade, which is expressed in denier units (1 denier=1 g. per 9000 meters).

The finer the fiber and the higher the packing density, the stronger will be the capillary forces that cause imbibition of oil. The capillary rise of oil against air and the downward imbibition against water will set a limit to the thickness of the porous body. The applicants have found that, with relatively fine fibers, complete oil saturation can still be obtained at an immersion depth in water of about eight inches.

The contact time needed at the air-oil-water surface for nearly complete oil saturation is determined by the capillary properties counteracted by the flow resistance, which is influenced by the size and permeability of the porous body and the oil viscosity. An increase of the capillary forces by using a higher packing density and a finer fiber is associated with a simultaneous increase in flow resistance. On the basis of the above considerations, the applicants have found that optimum results will be obtained when maintaining an average porosity of at least 80% and a fiber grade between 1.5 and 100 denier.

The density of the porous body is preferably kept below 1.00, but this is not necessary to keep the body floating, as special means may be provided, such as floats which prevent the body from sinking; however, preferably the density should not exceed 1.50, as otherwise it will become too bulky with respect to the porous body itself. As an alternative the organic polymer may, according to the invention, consist of foamed plastic material.

The porous body is preferably elongated and the body may be contained in a skin of permeable cloth.

A high rate of oil recovery may be obtained when according to the invention the porous body is made endless. The body may be composed of sections which are interconnected (see FIG. 4), which offers the advantage that an even distribution of the porous material can easily be obtained, and that, during operation plug formation will be avoided. The sections may suitably be interconnected in such a way that they are capable of rotating independently around a longitudinal axis. This may be achieved by rotatable coupling means known in the art as illustrated in block form in FIG. 4.

As an alternative, the porous body may comprise a flexible core provided with substantially radially arranged fibrous material fixed to said core, which results in a brush-type porous body.

Figure 3:
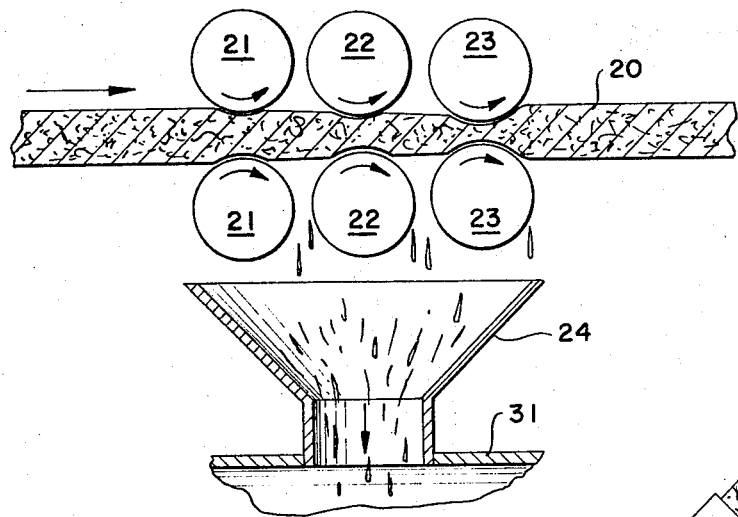
FIG. 3 is a schematic elevational view of one embodiment of squeezing means used in the invention.

In FIG. 3 one embodiment is shown for squeezing the oil-saturated porous body. The porous body 20 is passed through a slit between pairs of cylinders or rollers 21, 22 and 23, each pair being parallel and placed at such a distance from each other that the porous body can pass through the slit between each pair of cylinders. The slit between the cylinders 21 is of greater width than the slit between the last pair of cylinders 23, the slits successively decreasing in width. A receiving trough 24 is placed below the set of cylinders for collecting the recovered oil and leading it to a receiving container 31.

By placing the squeezer means for removing oil from the endless belt successively closer a more gradual removal of oil over a longer squeezing period is obtained as compared with the use of only one pair of rollers. This is of importance when handling viscous oil, say viscosity above 300 cS, since otherwise the pore pressure generated by the squeezing action would become excessively high, causing slippage and reduced life of the belt. With low viscous oils one pair of rollers generally appears adequate. Clearly the pore pressure generated also depends on the rate of circulation of the belt through the squeezer.

Figure 4:
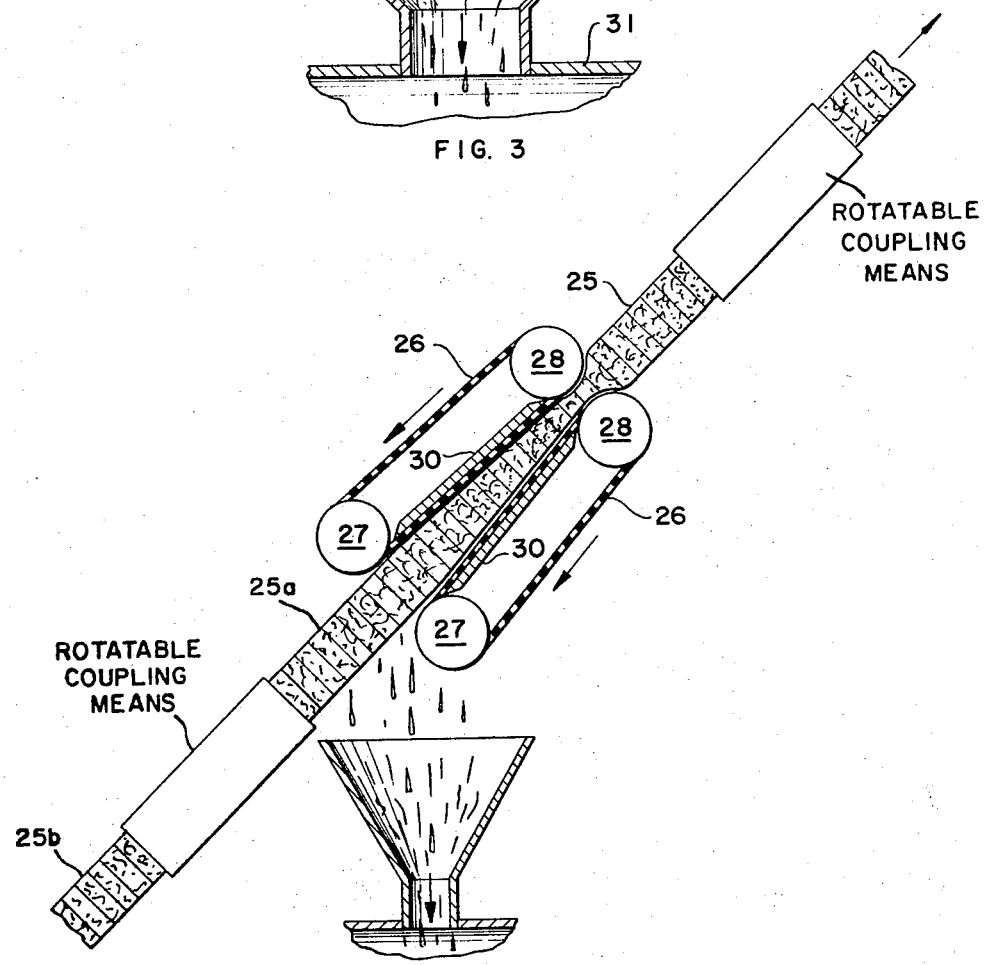
FIG. 4 is a schematic elevational view partially in block form of alternative squeezing means and an embodiment of the porous body of this invention.

FIG. 4 shows an alternative embodiment for squeezing the oil-saturated porous body. The porous body 25 is led through a slit which gradually narrows, this slit being formed between two endless belts 26 which are led over two pairs of cylinders 27 and 28, the distance between the parallel cylinders 27 being greater than that between the cylinders 28, thus forming the gradually decreasing width of the slit. A receiving trough 29 is placed at the lower end of this sloping arrangement and collected oil is led to a receiving container (not shown). Suitable supports 30 may be provided at the operating side of the endless belts. The distance between the belts may be made adjustable.

The rollers disclosed in the FIG. 3 embodiment or the endless belts of the FIG. 4 embodiment may be employed to drive the porous body past the squeeze zone. Alternatively, independent drive means may be employed to move the porous body.

It has been found that by restricting the squeeze pressure so that not all of the absorbed oil is recovered, damage to the porous body, especially when fibrous material is used, is greatly reduced, which lengthens considerably the period in which such a body can be used without the need of being renewed.

Both embodiments of the squeezing means are suitable for use in continuous operation. Of course it may also be possible to provide squeezing means which operate intermittently, for instance by means of a press through which the endless porous body is led stepwise.

The device according to the invention may be used for any purpose in cases where liquid floating on water is to be recovered. The method of oil removal, though aimed at dealing mainly with large scale oil pollution, may also find use in skimming oil from oil field and refinery drains.

We claim:

1. Apparatus for removing crude oil, oil products, or the like from a water surface comprising:
    first base means;
    second base means horizontally displaced and structurally separated from the first base means;
    a buoyant, elongated, oil absorbing, porous body in the form of an endless loop operatively connected to the first and second base means, the porous body floating on the water surface between the first and second mase means substantially unsupported except by the buoyant force of the water acting on the porous body;
    means mounted on the first base means for driving a first portion of the porous body in contact with the water surface from the first base means toward the second base means and for simultaneously driving a second portion of the porous body in contact with the water surface from the second base means toward the first base means;
    guiding means mounted on the second base means for returning the first portion of the porous body to the first base means;
    means operatively associated with at least one of the base means and in contact with the porous body for squeezing absorbed oil from the porous body; and
    means positioned adjacent the squeezing means for collecting the oil recovered from the porous body.

2. The apparatus of claim 1 wherein at least one of the structurally separated first and second base means comprises a moveable vessel floating on the water surface.

3. The apparatus of claim 2 wherein the structurally separated first and second base means comprise first and second moveable vessels floating on the water surface.

4. The apparatus of claim 2 wherein at least one of the structurally separated first and second base means comprises a shore installation.

5. The apparatus of claim 1 wherein the porous body is of substantially circular cross-section.

6. The apparatus of claim 1 wherein the squeezing means comprise a plurality of opposed spaced-apart rollers, each successive pair of rollers being spaced closer together than the preceding pair.

7. The apparatus of claim 1 wherein the squeezing means comprise a pair of endless belts rotatable around a series of cylinders and mutually arranged in such a way that a passage of decreasing thickness is created through which the porous body is passed.

8. The apparatus of claim 1 wherein the elongated porous body is contained in a skin of permeable cloth.

9. The apparatus of claim 1 wherein the elongated porous body is comprised of a plurality of interconnected sections.

10. The apparatus of claim 9 including rotatable coupling means interconnecting the sections whereby the sections are capable of rotating independently about a longitudinal axis.

11. The apparatus of claim 1 wherein the porous body has an average porosity of at least 80%.

12. The apparatus of claim 1 wherein the porous body comprises an organic polymer having a density between 0.85 and 1.50.

13. The apparatus of claim 12 wherein the organic polymer is polypropylene.

14. The apparatus of claim 12 wherein the organic polymer is polyamide.

15. The apparatus of claim 12 wherein the organic polymer consists of fibers with a fiber grade between 1.5 and 100 denier 16. The apparatus of claim 12 wherein the organic polymer is a foamed plastic material.

17. A method for removing oil from a water surface comprising the steps of:
   providing an elongated porous body of preferentially oil-wet buoyant material which floats on the water surface, the porous body having the form of an endless loop;
   extending the porous body across the water surface between first and second horizontally separated base means so that a major portion of the porous body is floating on the water surface between the first and second base means;
   contacting the oil with the porous body whereby the porous body absorbs oil;
   driving the floating porous body in a substantially horizontal plane in contact with the water surface between the first and second base means in such a manner that at least some of the porous body moves in contact with the water surface away from the first base means and toward the second means while at least some of the porous body simultaneously moves in contact with the water surface toward the first base means and away from the second base means;
   maintaining a major portion of the porous body floating on the water surface while driving the porous body between the base means;
   squeezing the porous body to remove oil therefrom; and
   collecting oil removed from the porous body.

18. The method of claim 17 wherein one of the first and second base means comprises a movable vessel floating on the water surface and the other of the first and second base means comprises a shore installation.

19. The method of claim 18 wherein an oil slick to be picked up is moving on the water surface and wherein the step of contacting the oil with the porous body comprises the step of positioning the moveable vessel in a position such that when the porous body is extended across the water surface between the moveable vessel and the shore installation the porous body contacts the advancing edge of the slick of oil and presents a barrier to the further advance of the oil slick on the water surface.

20. The method of claim 17 wherein the first and second horizontally separated base means comprise first and second horizontally separated moveable vessels floating on the water surface.

21. The method of claim 20 wherein the steps of squeezing the porous body and collecting oil removed therefrom are performed only on one of the two moveable vessels.

22. The method of claim 20 wherein the steps of squeezing the porous body and collecting oil removed therefrom are simultaneously performed on both of the two moveable vessels.

References Cited

UNITED STATES PATENTS

| | | | |
|---|---|---|---|
| 3,539,013 | 11/1970 | Smith | 210—242 |
| 3,334,042 | 8/1967 | Teltsma | 210—DIG 21 |
| 3,252,270 | 5/1966 | Pall et al. | 210—502 U X |
| 3,221,884 | 12/1965 | Muller | 210—DIG 21 |
| 3,330,206 | 7/1967 | Bechard | 100—153 |
| 2,200,552 | 5/1940 | Hook | 61—1 F |

REUBEN FRIEDMAN, Primary Examiner

T. A. GRANGER, Assistant Examiner

U.S. Cl. X.R.

210—DIG 21, 242